(12) United States Patent
Vijayanarasimhan

(10) Patent No.: US 9,076,065 B1
(45) Date of Patent: Jul. 7, 2015

(54) DETECTING OBJECTS IN IMAGES

(75) Inventor: Sudheendra Vijayanarasimhan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 620 days.

(21) Appl. No.: 13/359,468

(22) Filed: Jan. 26, 2012

(51) Int. Cl.
 *G06K 9/00* (2006.01)
 *G06K 9/46* (2006.01)
 *G06K 9/48* (2006.01)

(52) U.S. Cl.
 CPC .......... *G06K 9/4642* (2013.01); *G06K 9/00671* (2013.01)

(58) Field of Classification Search
 CPC .............. G06K 9/4642; G06K 9/6857; G06K 9/00369; G06K 9/00671
 USPC .................. 382/103, 159, 170, 171, 225, 281
 See application file for complete search history.

(56) References Cited

U.S. PATENT DOCUMENTS

| | | | |
|---|---|---|---|
| 2007/0115357 A1* | 5/2007 | Stein et al. ..................... | 348/148 |
| 2007/0237387 A1* | 10/2007 | Avidan et al. .................. | 382/159 |
| 2010/0272366 A1* | 10/2010 | Meng et al. .................... | 382/190 |
| 2011/0182477 A1* | 7/2011 | Tamrakar et al. ............. | 382/110 |
| 2011/0255741 A1* | 10/2011 | Jung et al. ..................... | 382/103 |

OTHER PUBLICATIONS

Vision-based bicyclist detection and tracking for intelligent vehicles Hyunggi Cho ; Rybski, P.E. ; Wende Zhang Intelligent Vehicles Symposium (IV), 2010 IEEE Digital Object Identifier: 10.1109/IVS.2010.5548063 Publication Year: 2010 , pp. 454-461; Papers (1).*
Comparative evaluation of pedestrian detection methods for mobile bus surveillance Leoputra, W.S. ; Venkatesh, S. ; Tan, T. Acoustics, Speech and Signal Processing, 2009. ICASSP 2009. IEEE International Conference on Digital Object Identifier: 10.1109/ICASSP.2009.4960386; Publication Year: 2009 , pp. 3525-3528.*
A novel hierarchical framework for human head-shoulder detection Fei He ; Yali Li ; Shengjin Wang ; Xiaoqing Ding Image and Signal Processing (CISP), 2011 4th International Congress on vol. 3 Digital Object Identifier: 10.1109/CISP.2011.6100413; Publication Year: 2011 , pp. 1485-1489.*

(Continued)

*Primary Examiner* — Kim Vu
*Assistant Examiner* — Michael Vanchy, Jr.
(74) *Attorney, Agent, or Firm* — Amin, Turocy & Watson, LLP

(57) ABSTRACT

Techniques for detecting the location of an object of interest in a visual image are presented. A detector component extracts Histogram of Gradient (HOG) features from grid regions associated with the visual image. A trained linear filter model uses a classifier to facilitate differentiating between positive and negative instances of the object in grid regions based on HOG features. A classifier component detects the K top-scoring activations of filters associated with the visual image. The classifier component detects the location of the object in the visual image based on a generalized Hough transform, given filter locations associated with the visual image. The classifier component projects the object location given filter activations and clusters the filter activations into respective clusters. The classifier component classifies whether a cluster is associated with the object based on the weighted sum of the activation scores of filters within the cluster and object detection criteria.

20 Claims, 9 Drawing Sheets

(56) References Cited

OTHER PUBLICATIONS

Comparative evaluation of pedestrian detection methods for mobile bus surveillance Leoputra, W.S.; Venkatesh, S.; Tan, T. Acoustics, Speech and Signal Processing, 2009. ICASSP 2009. IEEE International Conference on DOI: 10.1109/ICASSP.2009.4960386 Publication Year: 2009, pp. 3525-3528.*

Histogram of oriented gradients, Dec. 4, 2011, http://en.wikipedia.org/wiki/Histogram_of_oriented_gradients, Last accessed Jan. 16, 2012.

Zisserman, et al. "Category Level Localization," Visual Geometry Group, 145 pages, University of Oxford.

Divvala, et al. "Detecting Objects Using Unsupervised Parts-Based Attributes," 8 pages, Carnegie Mellon University and Microsoft Resarch.

Xin Li. "Vehicle License Plate Detection and Recognition," Dec. 2012, 69 pages, University of Missouri.

Felzenszwalb, et al. "A Discriminatively Trained, Multiscale, Deformable Part Model," Proceedings of the IEEE CVPR 2008, 8 pages.

Sidla, et al. "A Traffic Situation Analysis System," SPIE. Intelligent Robots and Computer Vision XXVIII: Algorithms and Techniques, Jan. 24, 2011, 10 pages, Proceedings vol. 7878, SLR Engineering, Graz, Austria.

Sarfraz, et al. "Real-Time Automatic License Plate Recognition for CCTV Forensic Applications," Journal of Real-Time Image Processing, Oct. 21, 2011, 11 pages, Springer-Verlag.

Pan, et al. "A Hybrid Approach to Detect and Localize Texts in Natural Scene Images," IEEE Transactions on Image Processing, Mar. 2011, on pp. 800-813, 14 pages, vol. 20, Issue 3.

* cited by examiner

DETECTING OBJECTS IN IMAGES

TECHNICAL FIELD

This disclosure relates generally to video processing, and more specifically to detecting objects in images.

BACKGROUND

For a number of different purposes, it can be desirable to detect different types of objects in video images. Detection and/or identification of objects, and/or their locations, in video images can be challenging for computing devices (e.g., computers). Further, conventional object detection techniques used to detect and identify objects, and/or their locations, in video images can be computationally expensive. For instance, one conventional object detection technique involves exhaustively evaluating all possible object locations by sliding windows of different scales, which can be a computationally expensive computing task.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to detecting the location of an object of interest in a visual image. Disclosed herein is a system including a detector component that extracts Histogram of Gradient (HOG) features from grid regions associated with a visual image to facilitate detection of a location of an object of interest in the visual image. The system also includes a classifier component that uses a trained linear filter model to determine whether the visual image potentially contains the object of interest based at least in part on the HOG features, wherein the classifier component further clusters a subset of filter activations associated with the trained filter model to generate a cluster of filter activations that identifies a potential location of the object of interest in the visual image, wherein the classifier component determines whether the cluster of filter activations is associated with the object of interest in the visual image based at least in part on a Hough transform and a weighted sum of filter activation scores of the subset of filter activations within the cluster of filter activations.

Also disclosed herein is a method including the act of determining, using a trained linear filter model, whether a video frame potentially contains an object of interest based at least in part on HOG features extracted from grid regions associated with the video frame. The method also can include the act of clustering a subset of filter activations associated with the video frame to generate a cluster of filter activations that potentially identifies a location of the object of interest in the video frame, wherein the subset of filter activations is derived at least in part from the trained linear filter model. The method further can include the act of classifying whether the cluster of filter activations is associated with the object of interest in the video frame, based at least in part on a Hough transform and a weighted sum of filter activation scores of the subset of filter activations within the cluster of filter activations.

Further disclosed herein is a system including means for identifying, using a trained linear filter model, whether a visual image potentially contains an object of interest based at least in part on HOG features extracted from grid regions associated with the visual image. The system also includes means for clustering a subset of filter activations associated with the visual image to generate a cluster of filter activations that potentially identifies a location of the object of interest in the visual image, wherein the subset of filter activations is derived at least in part from the trained linear filter model. The system further includes means for classifying whether the cluster of filter activations is associated with the object of interest in the visual image, based at least in part on a Hough transform and a weighted sum of filter activation scores of the subset of filter activations within the cluster of filter activations.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
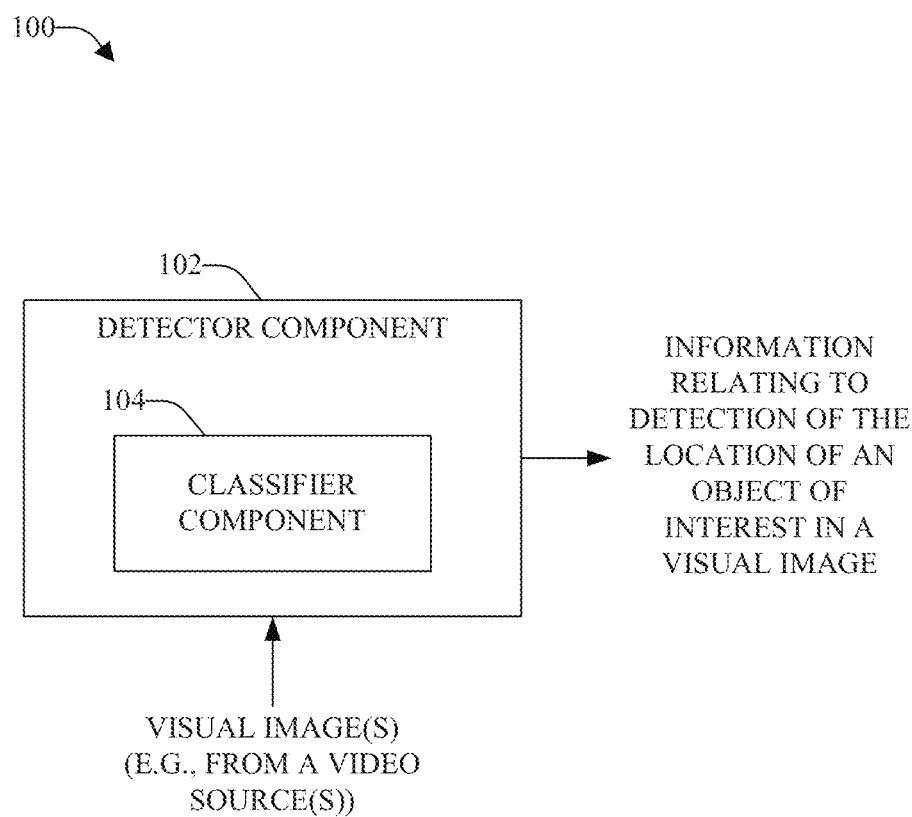
FIG. 1 illustrates a block diagram of an example system that can detect an object of interest in a visual image in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

For a number of different purposes, it can be desirable to detect different types of objects in video images. Detection and/or identification of objects, and/or their locations, in video images can be challenging for computing devices (e.g., computers). Further, conventional object detection techniques used to detect and identify objects, and/or their locations, in video images can be computationally expensive. For instance, one conventional object detection technique involves exhaustively evaluating all possible object locations by sliding windows of different scales, which can be a computationally expensive computing task.

To that end, techniques for efficient detection of an object of interest in visual (e.g., video) images are presented. A detector component can detect an object of interest and/or its location in one or more visual images. The detector component can include a classifier component that can classify one or more object instances in a visual image to detect the object of interest and/or its location in the image based at least in part on a type of Hough transform.

In some implementations, a set of training examples associated with an object (or a category) of interest (e.g., mobile phone, laptop computer, tablet, music player, video player, digital frame, or other type of product or object) can be available to train the classifier component. The set of training examples can be in the form of, for example, static video frames along with bounding boxes that can depict the extent of an object of interest in the video frame. A bounding box can be, for example, a box (e.g., a smallest-sized box) that can be formed to encompass or enclose an object (e.g., phone, computer, light bulb, television, apple, etc.) depicted in a video frame. The object can be a potential object of interest. The bounding box typically can be a square or rectangular box. A trainer component can be used in conjunction with the set of training examples to facilitate training the classifier component. The trainer component can divide the bounding boxes of the static video frames into respective grids of a desired size (e.g., N×N grid, with N being an integer number). The bounding boxes can have respective subsets of grid regions (e.g., square or rectangular grid regions) with the grid regions being defined by their grid. The trainer component can extract Histogram of Gradient (also referred to as Histogram of Oriented Gradient or HOG) features relating to objects or potential objects from each grid region.

In some implementations, the classifier component can use a linear filter model to facilitate object detection. The trainer component can use the set of training examples to train the linear filter model to differentiate between positive and negative training examples of each grid region (e.g., using a latent Support Vector Machine (SVM)). For instance, the positive training examples can be examples where the object of interest is in the example static video frame, and the negative training examples can be examples where the object of interest is not in the example static video frame. The classifier component can use the linear filter model (e.g., as trained) to detect object instances of the object of interest in a visual image (e.g., unique test video image), by detecting the K top-scoring activations of each filter of the linear filter model associated with the unique test image.

In certain implementations, the classifier component can use a form of generalized Hough transform (e.g., a weighted Hough transform) to identify the object of interest and/or obtain the location of the object of interest in the visual image given the filter locations. To facilitate identifying and locating the object of interest, the classifier component can project the object location given the filter activations, and can cluster respective subsets of these filter activations in respective clusters of filter activations using, for example, mean shift in the bounding box space. Each obtained cluster of filter activations can be a potential location of the object of interest in the visual image. A cluster also can contain or be associated with other information, including, for example, filter activation scores, information identifying the physical location of the object within the video frame, filters corresponding to the filter activations, etc.

For each cluster, to facilitate classifying whether a cluster of filter activations actually represents or identifies the object of interest, the classifier component can obtain or calculate the weighted sum of the activation scores of the filters within the cluster of filter activations, in accordance with the generalized Hough transform (e.g., weighted Hough transform). The trainer component can facilitate training the classifier component to identify the respective weights by using the set of training images (e.g., positive examples and negative examples) to train the classifier component to differentiate between an actual instance(s) of the object of interest in visual images and a detected false positive instance(s) of the object of interest in visual images.

Referring now to the drawings, FIG. 1 illustrates a block diagram of an example system 100 that can detect an object of interest in a visual image (e.g., a video image or frame) in accordance with various aspects and implementations described herein. The system 100 can include a detector component 102 that can detect an object of interest (e.g., mobile phone, laptop computer, tablet, music player, video player, digital frame, or other type of product or object, or a particular product or object of a particular brand, etc.) and/or its location in a visual image(s). The detector component 102 can be useful for localizing and recognizing digital visual images (e.g., images in files, web images, etc.) or videos (e.g., videos files, online videos, etc.) that contain a particular object of interest. The detector component 102 can obtain or otherwise receive visual images for object detection analysis from one or more sources, such as an online site or server, a content player or recorder, a data store, a cloud store, etc. The online site or server can include, for example, an online video hosting site or other media hosting site, a social network site, a streaming content provider, or a cloud server, etc. A content player or recorder can include, for example, a digital video recorder (DVR), a set-top box, a mobile phone, or a computer, etc. A data store can include, for example, a hard drive, flash memory, or disc storage media (e.g., digital video disk (DVD), compact disc, etc.), etc.

The detector component 102 can include a classifier component 104 that can classify an object instance(s) of the object of interest in the visual image(s) to identify the object of interest and/or its location in the visual image(s) based at least in part on a type of Hough transform. The classifier component 104 can be trained to facilitate detecting or classifying an object instance(s) in a visual image, as more fully disclosed herein.

The classifier component 104 can analyze the visual image to facilitate identifying features in the visual image. The classifier component 104 can identify one or more bounding boxes in the visual image. The classifier component 104 can divide a bounding box into a grid, which can be, for example, a grid of size N×N, where N can be a desired integer number. In some implementations, the classifier component 104 can divide a bounding box into a grid of size M×N, where M and N can be respective (e.g., different) desired integer numbers. The classifier component 104 can extract Histogram of Gradient (HOG) features from the respective content in the respective grid regions (e.g., grid sections) of the grid for the visual image.

The classifier component 104 can analyze the HOG features to detect object instances of the object of interest in the grid regions associated with the visual image (e.g., grid regions of the bounding box(es) associated with the visual image). In some implementations, the classifier component 104 can use a linear filter model to facilitate detecting objects in the visual image. The classifier component 104 can use the linear filter model (e.g., as trained) to detect an instance(s) of the object of interest in the visual image by detecting the K top-scoring activations of each filter of the linear filter model associated with the visual image, wherein K can be a desired integer number. The visual image may be, for example, a video frame being analyzed to detect a desired object of interest and/or a unique test video image or frame. The linear filter model can be trained to enable the linear filter model to differentiate between image grid regions that contain an object of interest and image grid regions that do not contain the object of interest to facilitate detecting object instances of the object of interest in a visual image, as more fully disclosed herein.

The classifier component 104 also can identify and/or classify one or more clusters of filter activations that can be a potential location(s) of an object of interest in the visual image. A cluster also can contain or be associated with other information, including, for example, filter activation scores, information identifying the physical location of the object within the video frame, filters corresponding to the filter activations, etc. In certain implementations, the classifier component 104 can use a form of generalized Hough transform (e.g., a weighted Hough transform) to identify the object of interest and/or obtain the location of the object of interest in the visual image given the filter locations associated with the linear filter model. To facilitate identifying and locating the object of interest, the classifier component 104 can project the object location given the filter activations, and can cluster respective subsets of these filter activations in respective clusters using, for example, mean shift in the bounding box space. Each obtained cluster of filter activations can be a potential location of the object of interest in the visual image.

For each cluster of the one or more clusters, to facilitate classifying whether a cluster of filter activations actually represents or identifies the object of interest, the classifier component 104 can obtain or calculate the weighted sum of the activation scores of the filter activations within the cluster, in accordance with the generalized Hough transform (e.g., weighted Hough transform). The classifier component 104 can determine whether the cluster of filter activations (e.g., cluster comprising a subset of filter activations) is associated with the object of interest in the visual image, based at least in part on a weighted sum of filter activation scores of a subset of filter activations (e.g., all or a smaller portion of the filter activations) within that cluster. The classifier component 104 can identify one or more of the clusters of filter activations associated with the visual image as being associated with the object of interest (e.g., when the object of interest is contained in the visual image). For example, a higher score (e.g., a score that meets or exceeds a threshold score for detection of an object) can indicate the object is detected within the visual image in a particular location of that visual image associated with the filter(s) being analyzed by the classifier component 104. The classifier component 104 can provide information relating to the location(s) of the object of interest within the visual image as an output.

The detector component 102, utilizing the classifier component 104, by directly detecting and/or identifying an object of interest and/or its location in a visual image, based at least in part on the filter activations associated with the visual image using the generalized Hough transform, can significantly reduce the computational expense for detecting object locations in a visual image, as compared to conventional object location detection techniques. Further, it is not necessary for the detector component 102 to exhaustively evaluate all possible object locations using, for instance, sliding windows of different scales in order for the detector component 102 to detect the location of an object of interest in a visual image. Thus, as a further result of the detector component 102 directly detecting and/or identifying an object of interest and/or its location in a visual image and not having to exhaustively evaluate all possible object locations, the detector component 102 can reduce the amount of time used in identifying the location of an object of interest in a visual image, as compared to convention object location detection techniques.

Figure 2:
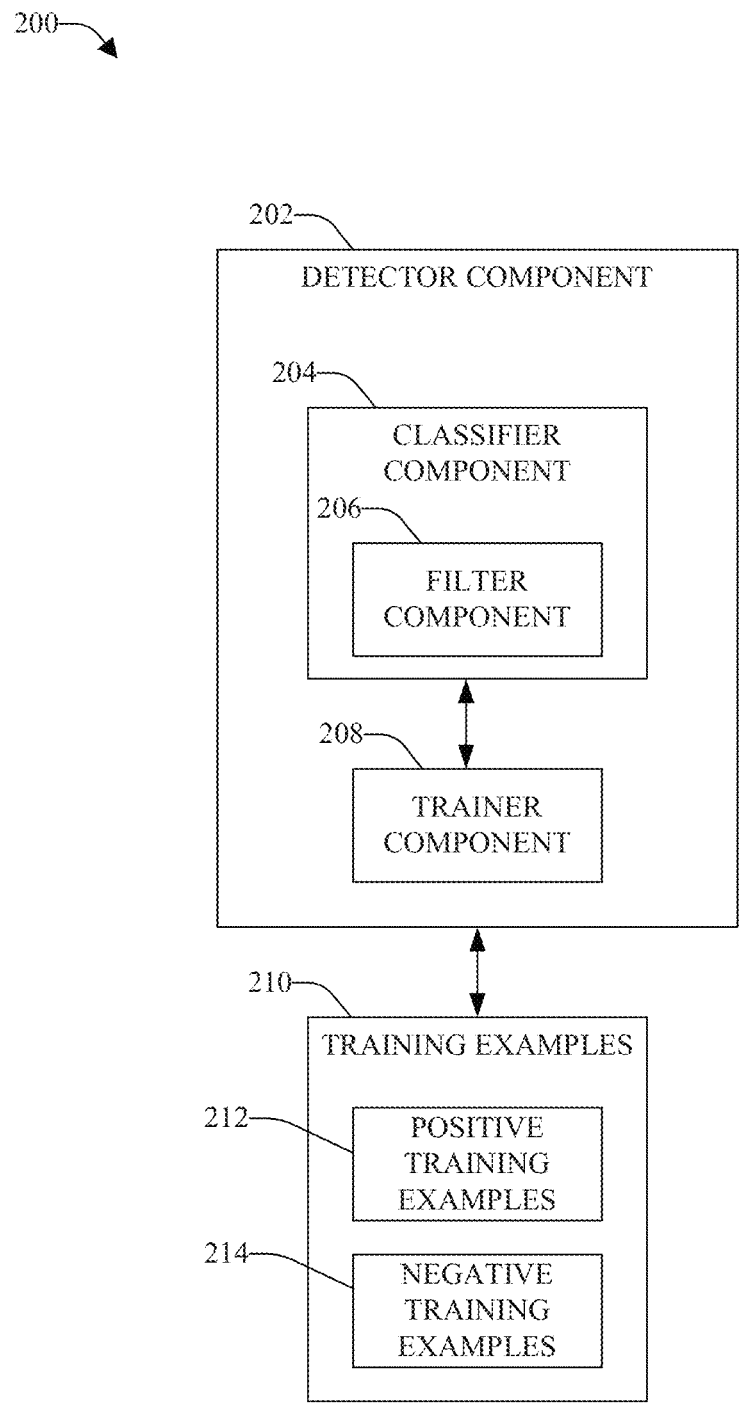
FIG. 2 depicts a block diagram of an example system that can train a classifier component to facilitate detecting a location of an object of interest in a visual image in accordance with various aspects and implementations of this disclosure.

FIG. 2 depicts a block diagram of an example system 200 that can train a classifier component to facilitate detecting a location of an object of interest in a visual image in accordance with various aspects and implementations of this disclosure. The system 200 can include a detector component 202 that can detect an object of interest and/or its location in a visual image(s). The detector component 202 can contain a classifier component 204 that can that can identify or classify an object instance(s) of the object of interest in the visual image(s) to identify the object of interest and/or its location in the visual image(s) based at least in part on a type of Hough transform. The detector component 202 and classifier component 204, respectively, can be the same as or similar to, and/or can include the same or similar functionality as, respective components (e.g., respectively named components), such as more fully disclosed herein.

The classifier component 204 can include a filter component 206 that can be configured and/or trained to differentiate between a visual image, or portion (e.g., grid region portion) thereof, that contains an object of interest and a visual image, or portion thereof, that does not contain the object of interest. In some implementations, the filter component 206 can use a linear filter model that can be trained to differentiate between positive example image grid regions, which can contain an object of interest, and negative example image grid regions, which may not contain the object of interest. The linear filter model can be trained to differentiate between such positive example image grid regions and negative example image grid regions using, for example, a desired classifier, such as an SVM (e.g., latent SVM). The trained linear filter model can differentiate between image grid regions having positive instances of the object of interest being located in the visual image and negative image grid regions where the object of interest is not contained in a grid region(s) associated with the visual image.

The detector component 202 can contain a trainer component 208 that can be associated with (e.g., communicatively connected to) the classifier component 204. The trainer component 208 can operate in conjunction with the classifier to facilitate training the classifier component 204 and/or filter component 206 (e.g., a linear filter model associated therewith) to differentiate between positive example image grid regions and negative example image grid regions. The trained linear filter model can differentiate between positive and negative instances of image grid regions having an object of interest being located in the visual image.

In some implementations, a subset (e.g., all or a portion of a set) of training examples 210 associated with an object (or a category) of interest (e.g., mobile phone, laptop computer, music player, or other type of product or object) can be available to train the classifier component 204 (e.g., train the linear filter model of the classifier component 204). The subset of training examples 210 can be in the form of, for example, static video frames along with bounding boxes that can depict the extent of an object of interest in a video frame (e.g., visual image). The subset of training examples 210 can include a subset of positive training examples 212 (e.g., positive example image grid regions), wherein each of the static video frames in this subset 212 contains one or more instances of an object of interest. The subset of positive training examples 212 can relate to, for example, positive instances of grid regions in the example visual images having respective HOG features and having the object of interest located in the example visual images. The positive training examples 212 can contain certain HOG features that can be indicative of the object of interest being located in the visual image. For example, if the object of interest is a mobile phone, the positive training examples 212 can include a video frame displaying the mobile phone and can contain certain HOG features indicative of the mobile phone being located in the video frame. The subset of positive training examples 212 also can include contextual information that can facilitate training of the classifier component 204. The contextual information can include information relating to the respective HOG features, other features of the example visual images that can provide an indication to the classifier component 204 that the object of interest is contained in the respective positive-example visual images, metadata, or other information associated with the respective positive training examples 212.

The subset of training examples 210 also can include a subset of negative training examples 214 (e.g., negative example image grid regions), wherein each of the static video frames in this subset 214 may contain content that does not include an instance of the object of interest. The subset of negative training examples 214 can relate to, for example, negative instances of grid regions in the example visual images that do not contain the object of interest located in such example visual images. The negative training examples 214 each can have respective HOG features. The negative training examples 214 can contain certain other HOG features that can be indicative of the object of interest not being located in the visual image. In relation to the subset of negative training examples 214, the trainer component 208 can provide information, such as contextual information, to the classifier component 204 and/or the linear filter model. The contextual information can include information relating to the respective HOG features or other features of the visual images that can provide an indication to the classifier component 204 that the object of interest is not contained in the respective negative-example visual images, metadata, or other information associated with the respective negative training examples 214. There can be respective (e.g., different) subsets of training examples for respective objects of interest.

To facilitate training the classifier component 204 to detect object location, the trainer component 208 can divide the bounding boxes of the static video frames into respective grids of a desired size (e.g., N×N grid, with N being a desired integer number; M×N grid, with M and N being respective desired integer numbers). A grid can divide the bounding box into a subset of grid regions with the grid regions demarcated by the grid lines. The trainer component 208 can extract Histogram of Gradient (HOG) features relating to objects or potential objects from each grid region associated with the subset of training examples 210 and/or can provide information indicating to the classifier component 204 what HOG features to extract from each grid region. The classifier component 204 can use the linear filter model (e.g., as trained by the trainer component 208) to detect an object instance(s) of an object of interest in a visual image (e.g., unique test visual image or other visual image being analyzed to detect a desired object of interest), as more fully disclosed herein.

When analyzing a visual image to determine whether there is an object instance(s) of an object of interest in the visual image, the classifier component 204 also can identify and/or classify one or more clusters of filter activations that can be a potential location(s) of the object of interest in the visual image. In some implementations, the classifier component 204 can use a form of generalized Hough transform (e.g., a weighted Hough transform) to identify the object of interest and/or obtain the location of the object of interest in the visual image given the filter locations associated with the linear filter model. The classifier component 104 can determine whether the cluster of filter activations is associated with the object of interest in the visual image, based at least in part on a weighted sum of filter activation scores of a subset of filter activations (e.g., all or a smaller portion of the filter activations) within that cluster of filter activations.

The trainer component 208 (e.g., using the classifier (e.g., SVM)) can facilitate training the classifier component 204 to identify the respective weights to be used in determining (e.g., calculating) the weighted sum of filter activation scores by using a subset (e.g., all or a portion) of training examples 210 (e.g., including positive examples and negative examples) to train the classifier component 204 to differentiate between an actual instance(s) of the object of interest in visual images and a detected false positive instance(s) of the object of interest in visual images. The subset of positive examples 212 can include one or more static video frames. Each of these static video frames can contain one or more instances of the object of interest and an associated weight value to be used when determining a weighted sum of filter activation scores in relation to detection of the object of interest. The subset of negative examples 214 also can include one or more static video frames. Each of these static video frames can include content that does not contain the object of interest and an associated weight value to be used when determining a weighted sum of filter activation scores in relation to detection of the object of interest.

In certain implementations, the trainer component 208 can dynamically or continually (e.g., accumulatively) train or update the classifier component 204 to have the linear filter model differentiate between positive example image grid regions and negative example image grid regions. In certain implementations, the trainer component 208 can, additionally or alternatively, dynamically or continually (e.g., accumulatively) train or update the classifier component 204 to identify respective weights for use in determining the weighted sum of filter activation scores in relation to detecting an object of interest in a visual image. As the detector component 202 operates to detect an object of interest and/or location of the object of interest in visual images, one or more of these visual images can be added to the subset of training examples 210. The trainer component 208 can add visual images involving a positive instance of object detection to the subset of positive examples 212, and can add visual images involving a negative instance of object detection to the subset of negative examples 214.

Based at least in part on defined object detection criteria relating to training of the classifier component 204, the one or more visual images proposed to be added to the subset of training examples 210 can be added with or without feedback from a user. The defined object detection criteria can relate to, for example, whether to automatically update the training of the classifier component 204 without user feedback, a confidence level or score associated with the detection of an object of interest in the visual image under consideration to be added to the subset of training examples 210, feedback from a user regarding adding the visual image under consideration to the subset of training examples 210, HOG features of a visual image, filter activation score(s) associated with a visual image, type of object or category, type of content in the visual image, metadata associated with the visual image, etc.

In some implementations, the trainer component 204 can analyze a visual image classified by the classifier component 204 or otherwise evaluated by the detector component 202 and can assign a confidence level or score to the results of the classification or evaluation of the visual image. A higher confidence score can indicate a higher level of confidence that the classification or evaluation of the visual image by the classifier component 204 and/or detector component 202 is correct or accurate. A relatively lower confidence score can indicate a lower level of confidence that the classification or evaluation of the visual image is correct or accurate. The confidence level or score can be different from or the same as the score (e.g., weighted sum or score associated therewith) used to determine whether an object instance of an object of interest is identified and/or classify whether a cluster of filter activations represents or identifies the object of interest. For instance, for a particular visual image, the classifier component 204 may determine that the weighted sum of activation scores of the filter activations for a particular cluster has a value that indicates an instance of the object of interest in a particular location of the visual image. However, upon evaluation of results of the evaluation or classification of the visual image by the classifier component 204, the trainer component 204 may determine that the confidence level in those results is relatively low (e.g., below a defined threshold confidence level for automatically adding information relating to the visual image to the subset of training examples 210) (even when the results by the classifier component are correct).

As a non-limiting training update example, when the defined object detection criteria so specifies, the trainer component 208 can automatically and dynamically update the training of the classifier component 204 (e.g., linear filter model of the classifier component 204) to use information associated with a visual image classified by the classifier component 204 when that visual image is associated with a confidence level that is at or above a defined minimum confidence level. For instance, information (e.g., results and/or the visual image) relating to the visual image can be added to the subset of training examples 210 and/or the trainer component 208 can update the training of the classifier component 204 based at least in part on the information relating to that visual image. If that visual image is associated with a confidence level that below the defined minimum confidence level, the trainer component 208 can determine that the visual information and associated information are not to be added to the subset of training examples 210 unless there is feedback from a user indicating that such visual image and associated information is to be added to the subset of training examples 210.

Figure 3:
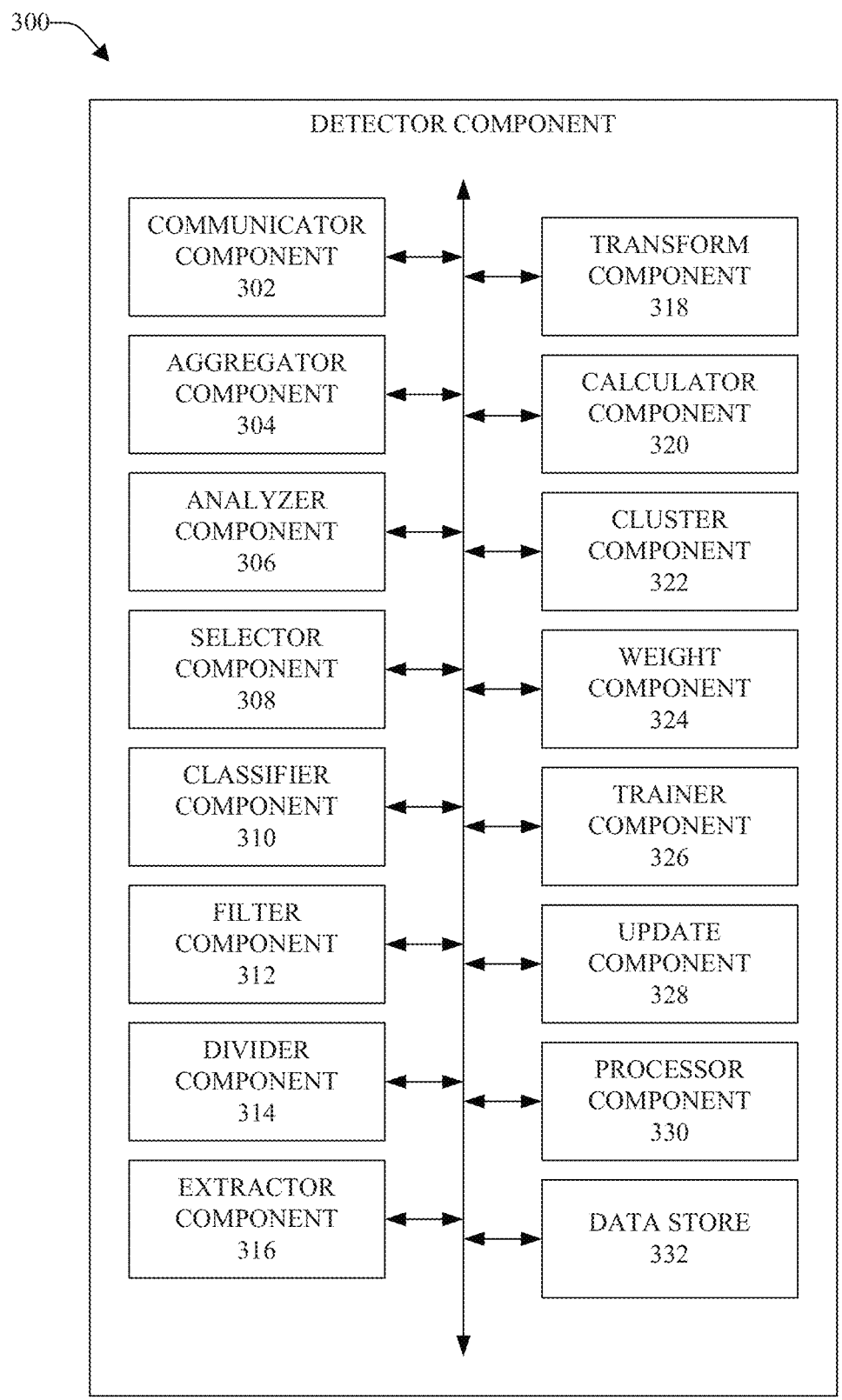
FIG. 3 illustrates a block diagram of an example detector component that can detect an instance of an object of interest and/or a location of the object of interest in one or more visual images in accordance with various aspects and implementations of this disclosure.

FIG. 3 illustrates a block diagram of an example detector component 300 that can detect an instance of an object of interest and/or a location of the object of interest in one or more visual images in accordance with various aspects and implementations of this disclosure. The detector component 300 can include a communicator component 302 that can be used to communicate (e.g., transmit, receive) information, including visual images, information relating to visual images, information that can facilitate training the detector component 300 (e.g., training the classifier component 310 and/or an associated linear filter model) to detect objects of interest in visual images, etc. The communicator component 302 can communicate information via one or more communication channels or connections, which can include a wireless or wireline communication channel(s) or connection(s).

The detector component 300 can contain an aggregator component 304 that can aggregate data received (e.g., obtained) from various entities (e.g., video image source, processor, data store, user interface, component(s) of the detector component 300, etc.). The aggregator component 304 can correlate respective items of data based at least in part on type of data, source of the data, time or date the data was generated or received, state of the data, object of interest to which the data relates or may relate, HOG features, type of HOG feature, cluster to which the item of data belongs or may belong, etc., to facilitate analyzing of the data by the analyzer component 306.

The detector component 300 can include an analyzer component 306 that can analyze data in relation to detecting and/or classifying an instance(s) of an object of interest in a visual image, and can generate analysis results, based at least in part on the data analysis. The analyzer component 306 can operate in conjunction with one or more other components (e.g., classifier component 310, calculator component 320, trainer component 326, etc.) to facilitate detecting and/or classifying an instance(s) of an object of interest in a visual image. For example, the analyzer component 306 can analyze information associated with a linear filter model in relation to a visual image to facilitate calculating the weighted sum of activation scores of the filter activations within a cluster of filter activations to facilitate classifying whether that cluster represents or identifies the object of interest.

The detector component 300 also can contain a selector component 308 that can select items of data, parameters (e.g., detection or classification parameters), an applicable algorithm, a visual image (e.g., training example images, unique visual image, etc.), or other information, to facilitate detecting an object of interest in a visual image, training the classifier component, etc. For example, the selector component 308 can select one or more parameters, one or more items of data, etc., relevant to a detection task or classification task being performed by the detector component 300.

The detector component 300 can include a classifier component 310 that can identify or classify information (e.g., cluster of filter activations, visual image or portion thereof, etc.) to facilitate identifying an instance of an object of interest in a visual image. For instance, the classifier component 310 can classify whether a cluster of filter activations, which can be a potential location of an object of interest within a visual image, actually is associated with the object of interest, as more fully disclosed herein.

The classifier component 310 can be associated with a filter component 312 that can include a linear filter model (e.g., as trained), which can differentiate between a grid region of a visual image that contains an object of interest and a grid region of a visual image that does not contain the object of interest. The linear filter model can be trained to perform such differentiation using a subset of positive examples and a subset of negative examples of respective grid regions associated with respective visual images (e.g., example visual images), as more fully disclosed herein.

The detector component 300 also can contain a divider component 314 that can divide a bounding box associated with a visual image into a grid containing grid portions (e.g., regions; section; cells, such as geospatial cells) of a desired size or shape. Each grid portion can be respectively associated with a location (e.g., geospatial location or region) of the visual image.

The detector component 300 also can include an extractor component 316 that can identify or extract information, such as HOG features, in or from a visual image (e.g., a grid portion of the visual image) to facilitate detecting whether there is an instance of an object of interest in the visual image. The detector component 300 can include a transform component 318 that operate in conjunction with the extractor component 316 to facilitate extracting information from the visual image (e.g., from the grid portion(s) of the visual image). The transform component 318 can use a desired image-analysis transform, such as a desired type of Hough transform (e.g., generalized and/or weighted Hough transform), to facilitate enabling the extractor component 316 to extract desired information (e.g., HOG features) from the visual image. The classifier component 310 can use the extracted information to facilitate classifying whether an object of interest is in the visual image (e.g., classify whether a cluster of filter activations is associated with the object of interest).

The detector component 300 also can include a calculator component 320 that can calculate a result based at least in part on various factors and/or functions associated with the calculation. The calculator component 320 can operate in conjunction with another component (e.g., analyzer component 306, classifier component 310, weight component 324, etc.) to calculate a result, such as a filter activation score, a weighted sum of filter activation scores, a confidence level or score, etc., that can be used to facilitate detecting an object of interest and/or its location in a visual image.

The detector component 300 can include a cluster component 322 that can cluster respective filter activations and/or other information (e.g., filter activation scores, information identifying location of the potential object of interest within the video frame, corresponding filters, etc.) associated with a location(s) or potential location(s) of an object of interest in a visual image. In some implementations, the cluster component 322 can use a mean shift in the bounding space of a bounding box to facilitate clustering the filter activations. The cluster component 322 can be associated with (e.g., contained within, communicatively connected to, operate in conjunction with, etc.) the classifier component 310 to facilitate classifying clusters of filter activations and detecting object instances in the visual image.

The detector component 300 also can include a weight component 324 that can operate in conjunction with the calculator component 320 or other components to facilitate obtaining (e.g., calculating) the weighted sum of filter activation scores of a cluster of filter activations to determine whether the cluster actually is associated with the object of interest. The weight component 324 can use a desired weight function and/or algorithm to facilitate obtaining the weighted sum of filter activation scores of a cluster.

In some implementations, the detector component 300 can contain a trainer component 326 that can train the classifier component 310, a filter component 312 and/or a weight component 324 to facilitate detecting instances of an object of interest within a visual image. For example, the trainer component 326 can train the classifier component 310 and/or filter component 312 to differentiate between a subset of positive training examples (e.g., positive example image grid regions) and a subset of negative training examples (e.g., negative example image grid regions).

As another example, the trainer component 326 also can train the classifier component 310 and/or weight component 324 to identify respective weights that can be used in relation to filter activation scores of filter activations associated with a cluster of filter activations to facilitate obtaining (e.g., calculating) weighted sums of the filter activation scores. The trainer component 326 can train the classifier component 310 and/or weight component 324 to differentiate between a subset of positive training examples (e.g., positive example image grid regions) and a subset of negative training examples (e.g., negative example image grid regions). This training of the classifier component 310 can facilitate accurate identification of actual object instances in a visual image and mitigate instances of false positive detection of an object of interest in a visual image. In some implementations, the trainer component can train the classifier component 310, filter component 312 and/or weight component 324 using a classifier, such as an SVM.

The detector component 300 can comprise an update component 328 that can modify or update training of the classifier component 310, filter component 312 and/or the weight component 324, based at least in part on detection results of a recent analysis of a visual image(s) in relation to detecting an instance(s) of an object of interest in the visual image(s) by the detector component 300 and defined object detection criteria. In some implementations, the update component 328 can determine whether to add results associated with a visual image to a subset of training examples and/or whether to update training of the classifier component 310, filter component 312 and/or the weight component 324, based at least in part on a confidence level associated with the detection results associated with the visual image, as more fully disclosed herein.

The system 300 can include a processor component 3330 that can operate in conjunction with the other components (e.g., communicator component 302, aggregator component 304, analyzer component 306, etc.) of the detector component 300 to facilitate performing the various functions of the detector component 300. The processor component 330 can employ one or more processors, microprocessors, or controllers that can process data. The data can relate to, for example, detecting an instance of an object of interest in a visual image, clustering filter activations associated with a visual image, determining filter activation scores, identifying or applying weights to filter activation scores to facilitate determining filter activation scores, training the detector component 300. The data also can relate to identifying bounding boxes, dividing bounding boxes into grid regions, identifying HOG features, identifying contextual information, analyzing data, sampling data, selecting data, applying an algorithm (e.g., detection algorithm, classification algorithm, etc.), etc., and/or information relating to other operations of the detector component 300, and/or other information. The processor component 330 can thereby facilitate operation of the detector component 300, as more fully disclosed herein, and control data flow between the detector component 300 and other components (e.g., source of visual images, etc.) associated with the detector component 300.

The detector component 300 can include a data store 332 that can store data structures (e.g., object-detection-related data, user data, metadata), code structure(s) (e.g., modules, objects, hashes, classes, procedures) and/or instructions. The data store 332 also can store information relating to detecting an instance of an object of interest in a visual image, clustering filter activations associated with a visual image, determining filter activation scores, identifying or applying weights to filter activation scores to facilitate determining filter activation scores, training the detector component 300. The data store 332 further can store information relating to identifying bounding boxes, dividing bounding boxes into grid regions, identifying HOG features, identifying contextual information, analyzing data, sampling data, selecting data, applying an algorithm (e.g., detection algorithm, classification algorithm, etc.), etc., and/or information relating to other operations of the detector component 300, and/or other information. The data structures, code structures, instruction, or other information stored in the data store 332 can be used to facilitate controlling operations associated with the detector component 300. The processor component 330 can be functionally coupled (e.g., through a memory bus) to the data store 332 to store and retrieve information desired to operate and/or confer functionality, at least in part, to the components of the detector component 300 (e.g., communicator component 302, aggregator component 304, analyzer component 306, etc.), and/or substantially any other operational aspects of the detector component 300.

While certain components (e.g., cluster component, filter component, etc.) are depicted in the detector component 300 as being separate components from the classifier component 310, this disclosure is not so limited. In accordance with various implementations, a component of the detector component 300 can be a separate component within the detector component 300, can be part of the classifier component 310, can be a stand-alone component, or can be distributed among various components, or any combination thereof, as desired.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems, components, and devices described above, example methods that can be implemented in accordance with this disclosure can be further appreciated with reference to flowcharts in FIGS. 4-7. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

Figure 4:
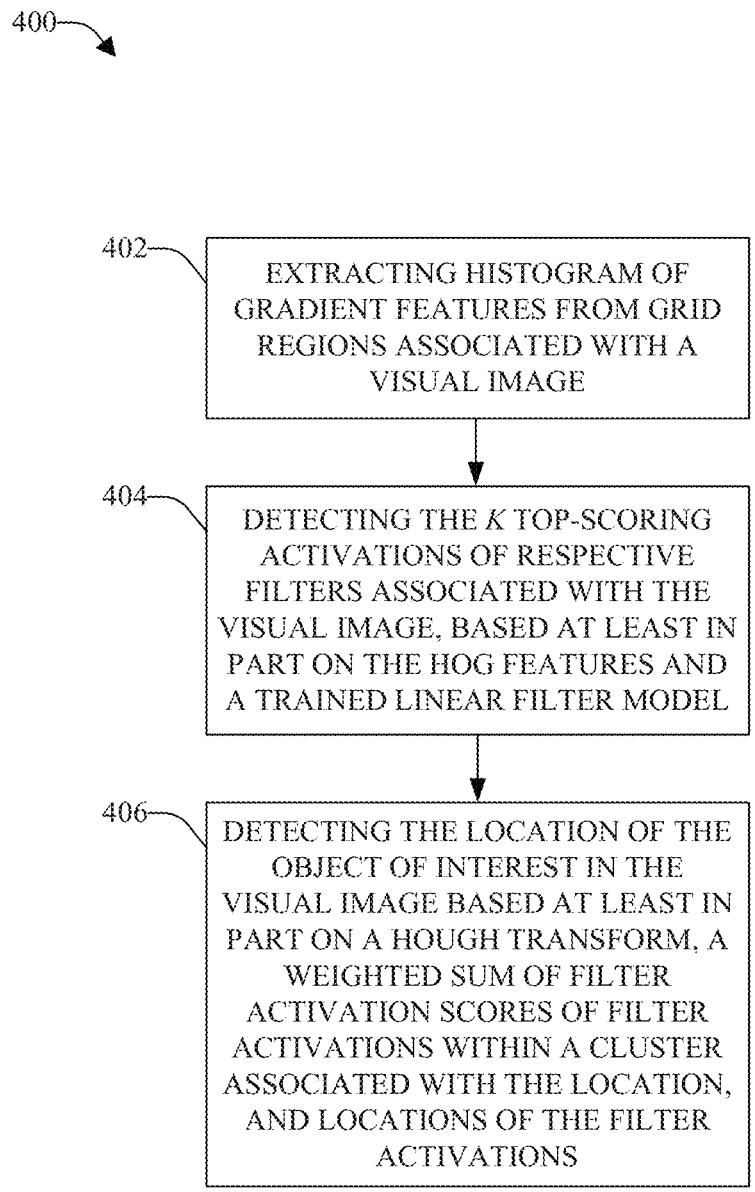
FIG. 4 illustrates a flow chart of an example method for detecting an instance of an object of interest and/or its location in a visual image, in accordance with various aspects and implementations.

With reference to FIG. 4, illustrated is a flow chart of an example method 400 for detecting an instance of an object of interest and/or its location in a visual image, in accordance with various aspects and implementations. The method 400 can be used, for example, by a detector component, which can include a classifier component.

At 402, HOG features can be extracted from grid regions associated with a visual image. The detector component can divide a bounding box(es) associated with the visual image into grids of a desired size (e.g., N×N) to form grid regions in the bounding box(es). The bounding box(es) can depict the extent of the object of interest in the visual image. The detector component can extract HOG features from the grids.

At 404, the K top-scoring activations of respective filters associated with the visual image can be detected, based at least in part on the HOG features and a trained linear filter model. The detector component can include a classifier component that can be used to facilitate detecting an instance of an object of interest in the visual image. The classifier component can use a linear filter model to detect object instances based at least in part on the HOG features extracted from the grid regions associated with the visual image. A trainer component can train the linear filter model to differentiate between positive instances of an object of interest being detected or located in a visual image and negative instances of the object of interest being detected or located in a visual image using a subset of training examples. The classifier component can use the trained linear filter model to determine (e.g., calculate) activation scores of filter activations associated with the visual image, and can detect the K top-scoring activations of respective filter activations associated with the visual image, based at least in part on the extracted HOG features.

At 406, the location of the object of interest in the visual image can be detected based at least in part on a Hough transform, a weighted sum of filter activation scores of filter activations within a cluster of filter activations associated with the location, and locations of the filter activations. The classifier component can use a generalized form of the Hough transform (e.g., weighted Hough transform) to obtain the location of the object of interest given the filter locations. The classifier component can project the object location given the filter activations, and can cluster the filter activations into respective clusters using mean shift in the bounding box space associated with the visual image. Each cluster obtained by the classifier component can be a potential location of the object of interest in the visual image.

For each of the obtained clusters of filter activations, the classifier component can classify whether a cluster actually represents or identifies the object of interest. To facilitate classification of a cluster of filter activations, the classifier component can determine (e.g., calculate, obtain, etc.) the weighted sum of the activation scores of the filter activations within that cluster. The classifier component can use a trained SVM to identify the weight factors that can be used to determine the weighted sum of the activation scores of the filter activations within the cluster. The trainer component can train the SVM (e.g., a linear SVM) to differentiate between actual instances and false positive instances of the location of the object of interest in a visual image using, for example, a subset of positive training examples and a subset of negative training examples, as more fully disclosed herein.

Figure 5:
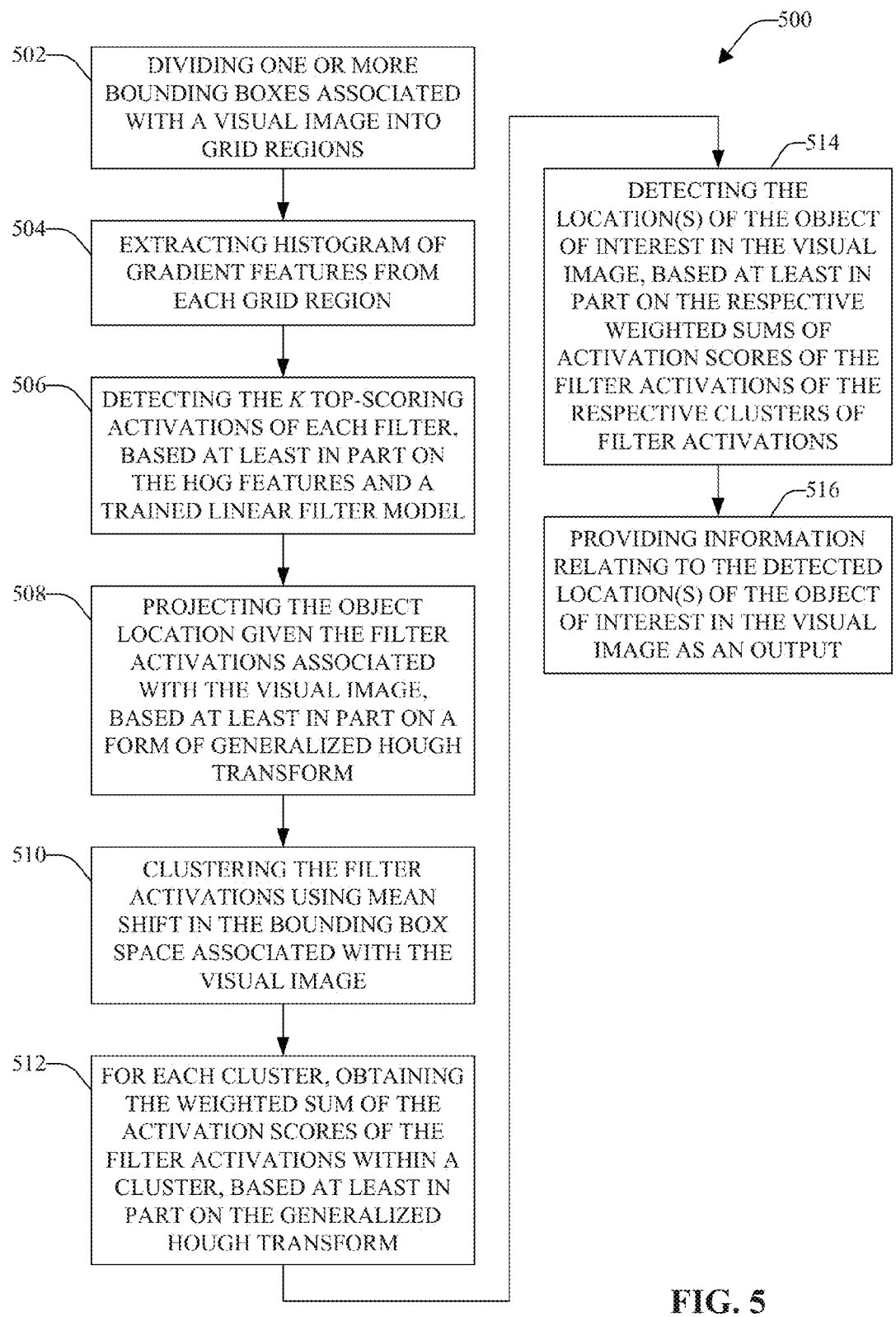
FIG. 5 depicts a flow chart of another example method for detecting an instance of an object of interest and/or its location in a visual image, in accordance with various aspects and implementations.

Referring next to FIG. 5, depicted is a flow chart of another example method 500 for detecting an instance of an object of interest and/or its location in a visual image, in accordance with various aspects and implementations. The method 500 can be used, for example, by a detector component, which can include a classifier component.

At 502, one or more bounding boxes associated with a visual image can be divided into grid regions (e.g., by the detector component). At 504, HOG features can be extracted from each grid region (e.g., by the detector component). At 506, the K top-scoring activations of each filter can be detected, based at least in part on the HOG features and a trained linear filter model. The detector component can include a classifier component that can use the trained linear filter model to detect the K top-scoring activations of each filter, based at least in part on the extracted HOG features.

At 508, the object location can be projected given the filter activations associated with the visual image, based at least in part on a form of generalized Hough transform (e.g., weighted Hough transform). The classifier component can project the object location given the filter activations associated with the visual image. At 510, the filter activations can be clustered (e.g., by the classifier component) using mean shift in the bounding box space associated with the visual image. Each cluster of filter activations can represent a potential location of the object of interest in the visual image.

At 512, for each cluster, the weighted sum of the activation scores of the filter activations within a cluster can be obtained (e.g., by the classifier component), based at least in part on the generalized Hough transform. The classifier component can use a trained classifier (e.g., trained SVM) to obtain the weighted sum of the activation scores of the filter activations within a cluster. The trainer component can train the classifier to differentiate between actual instances and false positive instances of the location of the object of interest in a visual image using, for example, a subset of positive training examples and a subset of negative training examples, as more fully disclosed herein.

At 514, the location(s) of the object of interest can be detected in the visual image, based at least in part on the respective weighted sums of activation scores of the filter activations of the respective clusters of filter activations. The classifier component can evaluate the respective weighted sums of activation scores of the filter activations of the respective clusters of filter activations, and can identify one or more clusters of the plurality of clusters that meet defined object detection criteria that indicates the location of the object has been detected. In some implementations, the defined object detection criteria can specify that a cluster associated with a weighted sum of activations scores that meets or exceeds a defined minimum threshold value can be associated with the object of interest. The classifier component can identify one or more clusters of filter activations that meet the defined object detection criteria. The classifier component can identify one or more respective locations in the visual image that are respectively associated with the one or more clusters of filter activations.

At 516, information relating to the detected location(s) of the object of interest in the visual image can be provided as an output (e.g., by the classifier component). The classifier component can communicate the information relating to the detected location(s) of the object of interest in the visual image as an output to a desired entity (e.g., display screen, an application, a user, etc.).

Figure 6:
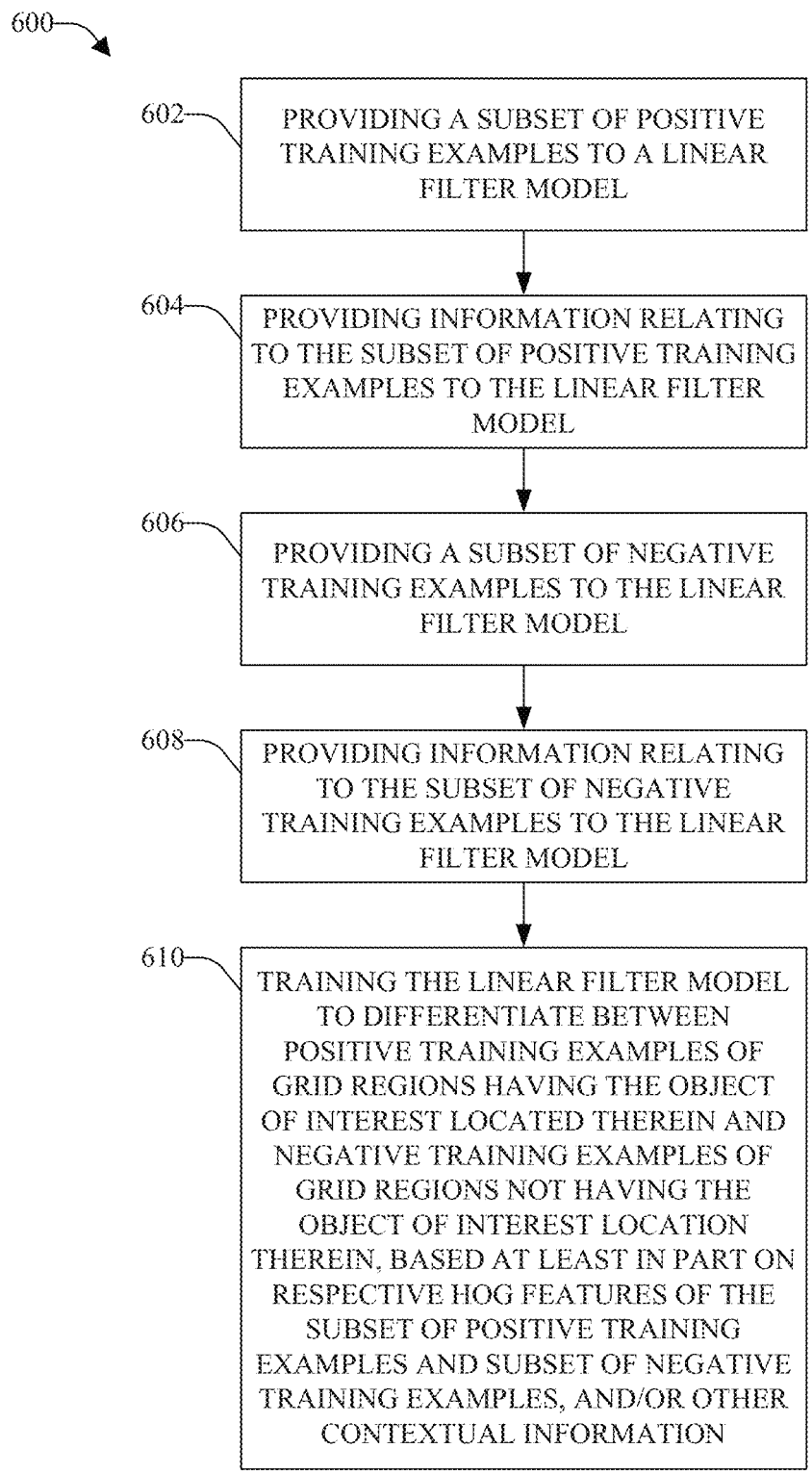
FIG. 6 illustrates a flow chart of an example method for training a linear filter model associated with a classifier component to differentiate between positive instances of detecting an object of interest and negative instances of detecting the object of interest in grid regions associated with visual images, in accordance with various aspects and implementations.

FIG. 6 illustrates a flow chart of an example method 600 for training a linear filter model associated with a classifier component to differentiate between positive instances (e.g., examples of positive instances) of detecting an object of interest and negative instances (e.g., examples of negative instances) of detecting the object of interest in grid regions associated with visual images (e.g., example visual images), in accordance with various aspects and implementations. The method 600 can be used by a trainer component to train the classifier component to facilitate detecting location of an object of interest in visual images.

At 602, a subset of positive training examples (e.g., example positive visual images) can be provided (e.g., applied) to, for example, a linear filter model associated therewith (e.g., by a trainer component). The subset of positive training examples can relate to, for example, positive instances of grid regions in the example visual images having respective HOG features and having the object of interest located in the example visual images.

At 604, information (e.g., contextual information) relating to the subset of positive training examples can be provided (e.g., applied) to, for example, the linear filter model (e.g., by the trainer component). In relation to the subset of positive training examples, the trainer component can provide information, such as contextual information, to the linear filter model. The contextual information can include information relating to the respective HOG features, other features of the visual images that can provide an indication to the linear filter model that the object of interest is contained in the respective positive-example visual images, metadata, or other information associated with the respective positive training examples.

At 606, a subset of negative training examples (e.g., example negative visual images) can be provided (e.g., applied) to, for example, the linear filter model (e.g., by the trainer component). The subset of negative training examples can relate to, for example, negative instances of grid regions in the example visual images that do not contain the object of interest located in such example visual images. The negative training examples each can have respective HOG features.

At 608, information (e.g., contextual information) relating to the subset of negative training examples can be provided (e.g., applied) to, for example, the linear filter model (e.g., by the trainer component). In relation to the subset of negative training examples, the trainer component can provide information, such as contextual information, to the linear filter model. The contextual information can include information relating to the respective HOG features, other features of the visual images that can provide an indication to the classifier component that the object of interest is not contained in the respective negative-example visual images, metadata, or other information associated with the respective negative training examples.

At 610, the linear filter model can be trained to differentiate between positive training examples of grid regions having the object of interest located therein and negative training examples of grid regions not having the object of interest location therein, based at least in part on respective HOG features of the subset of positive training examples and subset of negative training examples, and/or other contextual information. The trainer component can train the linear filter model to differentiate between positive examples of grid regions having the object of interest located therein and negative examples of grid regions not having the object of interest location therein, based at least in part on respective HOG features of the subset of positive training examples and subset of negative training examples. The positive training examples of grid regions can contain certain HOG features that can be indicative of the object of interest being located in the visual image. The negative training examples of grid regions can contain certain other HOG features that can be indicative of the object of interest not being located in the visual image.

The trainer component can train the linear filter model to identify HOG features indicative of a positive instance of detection of an object of interest in a visual image, and identify the location of the object of interest within the image based at least in part on identifying such HOG features. The trainer component also can train the linear filter model to identify HOG features indicative of a negative instance (or a false positive instance) of detection of an object of interest in a visual image, and determine the object of interest is not within the image based at least in part on the identified HOG features.

In some implementations, the method 600 can be used to update or continue to train the linear filter model, based at least in part on visual images that are analyzed and classified by the classifier component using the linear filter model, as more fully disclosed herein. The trainer component can update or continue training the linear filter model dynamically and/or in response to user feedback relating to the accuracy of the classification of the classified visual images, which are candidates for use as training examples.

Figure 7:
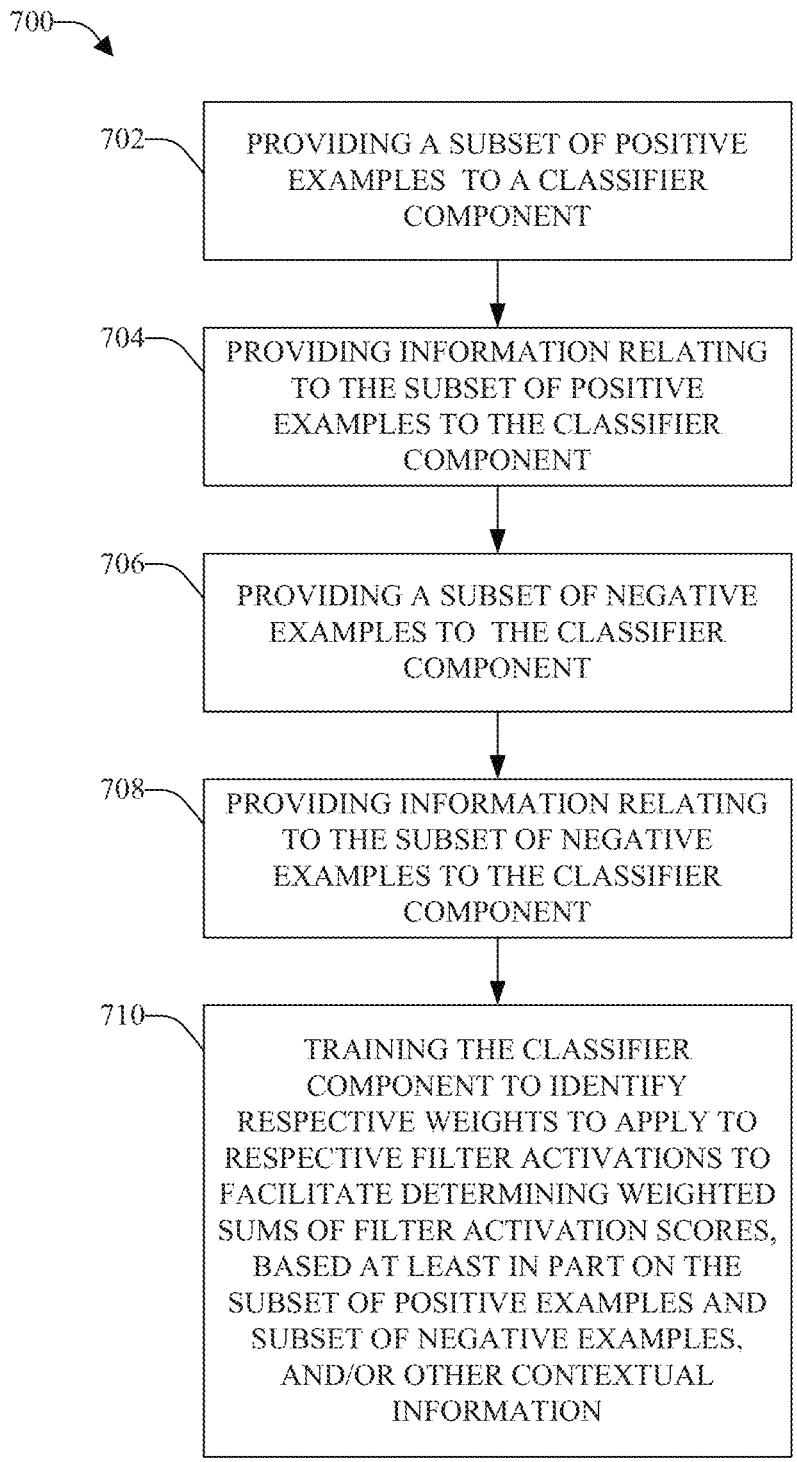
FIG. 7 depicts a flow chart of an example method for training a classifier component to identify respective weights to apply to respective filter activation scores to facilitate determining weighted sums of filter activation scores to facilitate detecting an object of interest in a visual image, in accordance with various aspects and implementations.

FIG. 7 depicts a flow chart of an example method 700 for training a classifier component to identify respective weights to apply to respective filter activation scores to facilitate determining weighted sums of filter activation scores to facilitate detecting an object of interest in a visual image, in accordance with various aspects and implementations. The method 700 can be used by a trainer component to train the classifier component to facilitate detecting location of an object of interest in visual images.

At 702, a subset of positive examples (e.g., example positive visual images) can be provided (e.g., applied) to, for example, a classifier component (e.g., by a trainer component). The subset of positive examples can be, for example, visual images that include actual instances of the object of interest being located in the visual images.

At 704, information (e.g., contextual information) relating to the subset of positive examples can be provided (e.g., applied) to, for example, the classifier component (e.g., by the trainer component). In relation to the subset of positive examples, the trainer component can provide information, such as contextual information, to the classifier component. The contextual information can include information relating to location of the object of interest in the example visual images, features of the visual images that can provide an indication to the classifier component of the location of the object of interest in the respective positive-example visual images, metadata, or other information associated with the respective positive examples.

At 706, a subset of negative examples (e.g., example negative visual images) can be provided (e.g., applied) to, for example, the classifier component (e.g., by the trainer component). The subset of negative examples can be, for example, visual images that do not contain the object of interest.

At 708, information (e.g., contextual information) relating to the subset of negative examples can be provided (e.g., applied) to, for example, the classifier component (e.g., by the trainer component). In relation to the subset of negative examples, the trainer component can provide information, such as contextual information, to the classifier component. The contextual information can include information relating to features of the visual images that can provide an indication to the classifier component that the object of interest is not contained in the respective negative-example visual images, metadata, or other information associated with the respective negative examples. The contextual information can facilitate training the classifier component to detect or identify visual images that are false positive instances of detecting the location of the object of interest in visual images.

At 710, the classifier component can be trained to identify respective weights to apply to respective filter activations to facilitate determining weighted sums of filter activation scores, based at least in part on the subset of positive examples and subset of negative examples, and/or other contextual information, to facilitate detecting an object of interest in a visual image. The trainer component can use the subset of positive examples and subset of negative examples to facilitate training the classifier component to differentiate between positive examples of detecting the location of the object of interest in visual images and negative examples of visual images that do not have the object of interest located therein, based at least in part on respective features of the subset of positive examples and subset of negative examples, and/or other contextual information. The features can include HOG features, for example. As part of this training, the trainer component, using the subset of positive examples and subset of negative examples and/or contextual information, also can train the classifier component to identify respective weights to apply to respective filter activations to facilitate determining weighted sums of filter activation scores.

The positive examples of visual images, including grid regions, can contain certain features that can be indicative of the location of the object of interest in the visual image. The negative examples of visual images, including grid regions, can contain certain other features that can be indicative of the object of interest not being located in the visual image and/or indicative of certain features that may give rise to false positive instances where an incorrect detection of the location of the object of interest in a visual image may result. With regard to the negative examples relating to instances of false positives, the trainer component can train the classifier component to be able to identify instances where a positive indication is falsely given even though the object of interest is not located in the visual image or portion thereof (e.g., region of image with a bounding box).

In some implementations, the method 700 can be used to update or continue to train the classifier component, based at least in part on visual images that are analyzed and classified by the classifier component, as more fully disclosed herein. The trainer component can update or continue training the classifier component dynamically and/or in response to user feedback relating to the accuracy of the classification of the classified visual images, which are candidates for use as training examples.

Figure 8:
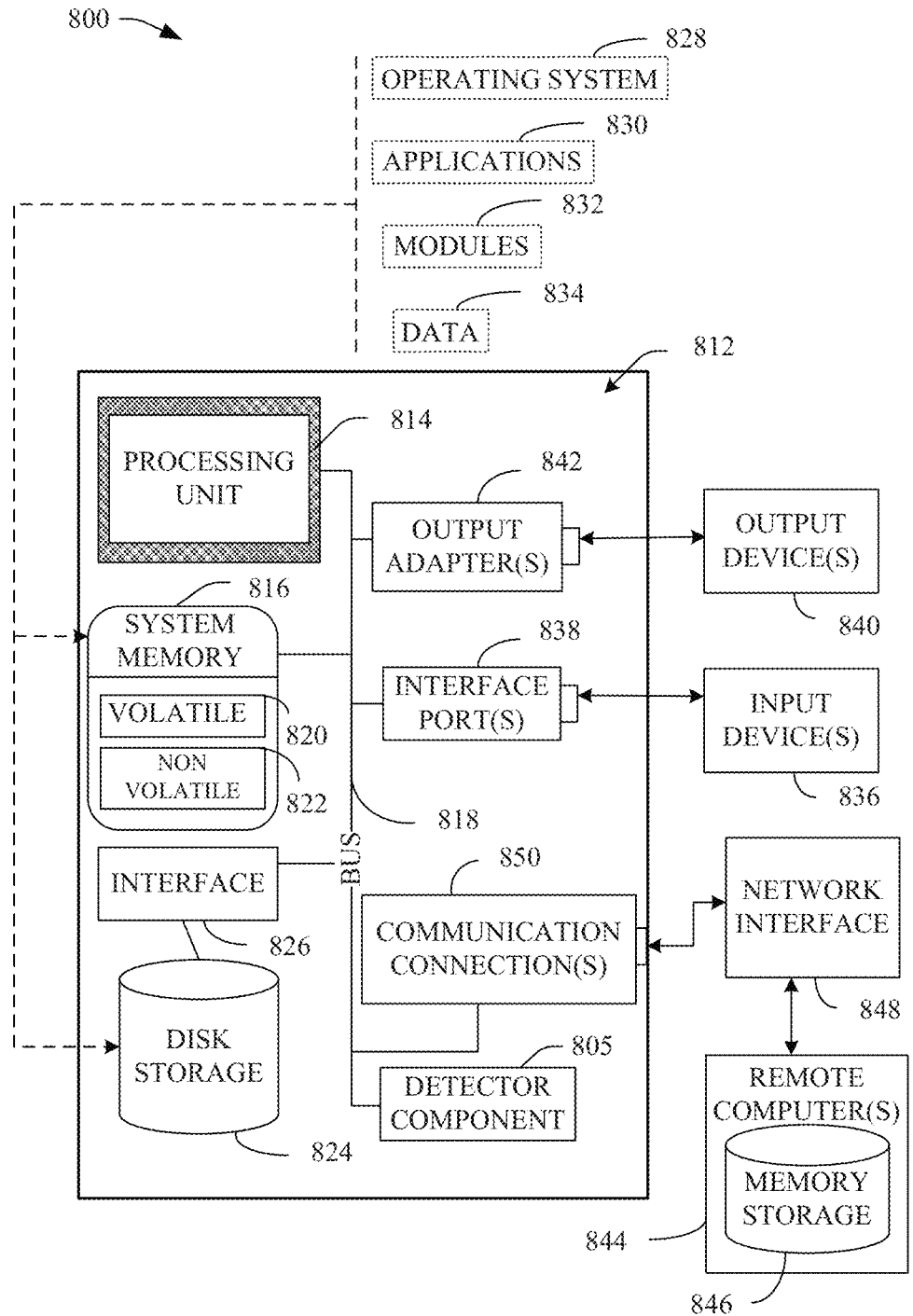
FIG. 8 is a schematic block diagram illustrating a suitable operating environment.
Figure 9:
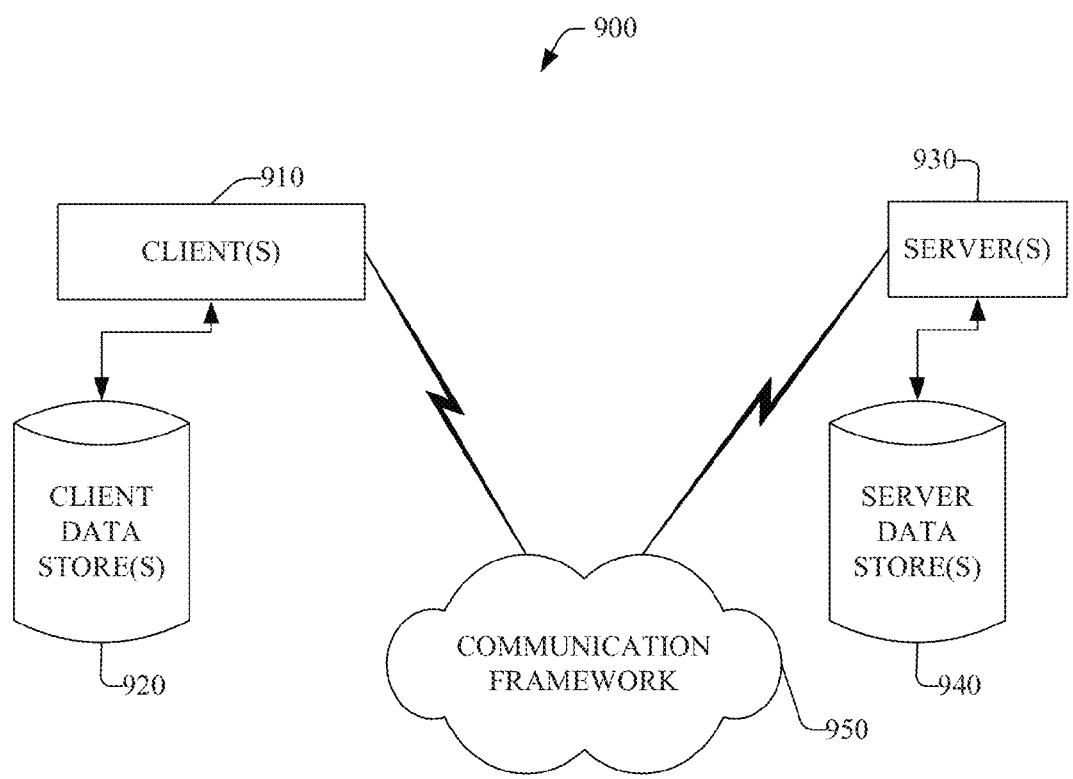
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented.

With reference to FIG. 8, a suitable environment 800 for implementing various aspects of this disclosure includes a computer 812. The computer 812 includes a processing unit(s) 814, a system memory 816, and a system bus 818. The system bus 818 couples system components including, but not limited to, the system memory 816 to the processing unit 814. The processing unit(s) 814 can be any of various available processors. Dual microprocessors and other multiprocessor architectures also can be employed as the processing unit(s) 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 also includes removable/non-removable, volatile/non-volatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826.

FIG. 8 also depicts software that acts as an intermediary between users and the basic computer resources described in the suitable operating environment 800. Such software includes, for example, an operating system 828. Operating system 828, which can be stored on disk storage 824, acts to control and allocate resources of the computer system 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

In accordance with various aspects and implementations, the computer 812 can be used to detect an instance(s) and/or location(s) of an object of interest in a visual image(s). As more fully disclosed herein, in some implementations, the computer 812 can include one or more processors (e.g., processing units 814) that can be used to process data, including processing data to perform various object-detection-related tasks on data (e.g., sequentially or in parallel). The object-detection-related tasks can include, for example, detecting object instances in a visual image, calculating or detecting filter activation scores, clustering filter activation scores (and/or filter activations and/or other information), determining a weighted sum of filter activation scores, training the detector component 805, extracting HOG features associated with a visual image, etc. The computer 812 can include a detector component 805 that can be associated with (e.g., communicatively connected to) the one or more processors. The detector component 805 can contain, for example, a classifier component, a trainer component, or other components, which can respectively function as more fully disclosed herein, to facilitate detecting an object of interest and/or its location in a visual image.

FIG. 9 is a schematic block diagram of a sample-computing environment 900 with which the subject matter of this disclosure can interact. The system 900 includes one or more client(s) 910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing this disclosure, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

It is to be appreciated and understood that components (e.g., detector component, classifier component, trainer component, etc.), as described with regard to a particular system or method, can include the same or similar functionality as respective components (e.g., respectively named components or similarly named components) as described with regard to other systems or methods disclosed herein.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   at least one memory that stores computer executable components; and
   at least one processor that executes the following computer executable components stored in the at least one memory:
      a detector component that extracts Histogram of Gradient (HOG) features from grid regions associated with a visual image to facilitate detection of a location of an object of interest in the visual image; and
      a classifier component that uses a trained linear filter model to determine whether the visual image potentially contains the object of interest based at least in part on the HOG features, wherein the classifier component clusters a subset of filter activations associated with the trained filter model to generate a cluster of filter activations that identifies a potential location of the object of interest in the visual image, and wherein the classifier component determines whether the cluster of filter activations is associated with the object of interest in the visual image based at least in part on a Hough transform and a weighted sum of filter activation scores of the subset of filter activations within the cluster of filter activations.

2. The system of claim 1, wherein the detector component divides a bounding box into a grid, and extracts the HOG features from the grid regions defined by the grid, wherein the bounding box is at least potentially associated with the object of interest in the visual image.

3. The system of claim 1, wherein the detector component comprises a trainer component, wherein the trainer component uses a support vector machine to train a linear filter model to produce the trained linear filter model that differentiates between a subset of example positive visual images that contain the object of interest and a subset of example negative visual images that do not contain the object of interest, and wherein the subset of example positive visual images includes a first subset of HOG features indicative of the example positive visual images containing the object of interest and the subset of example negative visual images includes a second subset of HOG features indicative of the example negative images not containing the object of interest.

4. The system of claim 3, wherein the detector component divides bounding boxes associated with a subset of example visual images into grid regions, and extracts respective HOG features from each of the grid regions, wherein the respective bounding boxes are associated with one or more objects in example visual images of the subset of example visual images, and wherein the subset of example visual images comprises the subset of example positive visual images and the subset of example negative visual images.

5. The system of claim 1, wherein the classifier component detects, in the visual image, a defined number of higher-scoring filter activations of each filter associated with the subset of filter activations associated with the trained linear filter model, based at least in part on the HOG features, to facilitate detection of object instances in the visual image, wherein the higher-scoring filter activations have higher filter activation scores as compared to other filter activation scores of other filter activations associated with the subset of filter activations.

6. The system of claim 5, wherein the classifier component projects the location of the object of interest, based at least in part on the higher-scoring filter activations using mean shift in relation to space of a bounding box associated with the object of interest, and wherein the classifier component obtains the location of the object of interest based at least in part on the Hough transform and the respective filter locations associated with the subset of filter activations associated with the trained linear filter model, wherein the Hough transform is a generalized Hough transform.

7. The system of claim 6, wherein the classifier component classifies whether respective clusters of filter activations of a subset of clusters of filter activations, comprising the cluster of filter activations, relate to the object of interest, and identifies the cluster of filter activations as relating to the object of interest based at least in part on the classification of the respective clusters of filter activations.

8. The system of claim 7, wherein the classifier component obtains a weighted sum of respective filter activation scores associated with respective filters within a particular cluster of filter activations of the subset of clusters of filter activations to facilitate classification of the particular cluster of filter activations.

9. The system of claim 8, wherein the classifier component analyzes a subset of training visual images to generate respective weighted sums of the respective filter activation scores, and trains a linear classifier to differentiate between instances of accurate detection of a location of the object of interest in visual images and detected false positives relating to incorrect instances of detection of a location of the object of interest in visual images.

10. The system of claim 1, wherein the detector component is further configured to comprise a trainer component, wherein the trainer component is configured to use a support vector machine to train the classifier component to differentiate between a subset of example positive instances of accurate detection of a location the object of interest in a visual image and a subset of example negative instances of accurate indication that a visual image does not contain the object of interest.

11. A method, comprising:
employing at least one processor to facilitate execution of code instructions retained in at least one memory device, the at least one processor, in response to execution of the code instructions, performs operations comprising:
determining, using a trained linear filter model, whether a video frame potentially contains an object of interest based at least in part on Histogram of Gradient (HOG) features extracted from grid regions associated with the video frame;
clustering a subset of filter activations associated with the video frame to generate a cluster of filter activations that potentially identifies a location of the object of interest in the video frame, wherein the subset of filter activations is derived at least in part from the trained linear filter model; and
classifying whether the cluster of filter activations is associated with the object of interest in the video frame, based at least in part on a Hough transform and a weighted sum of filter activation scores of the subset of filter activations within the cluster of filter activations.

12. The method of claim 11, further comprising:
detecting the location of the object of interest in the video frame based at least in part on a weighted Hough transform.

13. The method of claim 11, further comprising:
dividing a bounding box associated with the video frame into a grid; and
extracting respective subsets of the HOG features from the grid regions defined by the grid.

14. The method of claim 11, further comprising:
identifying a subset of example video frames relating to the object of interest and comprising a subset of positive example video frames and a subset of negative example video frames;
dividing bounding boxes of the subset of example video frames into grids to form respective subsets of grid regions defined by the grids, wherein respective bounding boxes depict an extent of the object of interest in respective example video frames in the subset of example video frames;
extracting respective HOG features from each grid region in the subset of example video frames; and
training a linear filter model to generate the trained linear filter model that differentiates between the subset of example positive video frames and the subset of example negative video frames.

15. The method of claim 11, further comprising:
detecting a defined number of higher-scoring filter activations of each filter associated with the subset of filter activations associated with the trained linear filter model, wherein the higher-scoring filter activations have higher filter activation scores relative to other filter activation scores of other filter activations associated with the subset of filter activations;
projecting the location of the object of interest, based at least in part on a subset of the higher-scoring filter activations associated with the trained linear filter model in relation to the video frame; and
generating a subset of clusters of filter activations, comprising respective subsets of filter activations associated with the higher-scoring filter activations, using mean shift in relation to space of a bounding box associated with the object of interest.

16. The method of claim 15, further comprising:
identifying the location of the object of interest based at least in part on the Hough transform and the respective filter locations associated with the respective filter activations in the subset of filter activations associated with the trained linear filter model, wherein the Hough transform is a generalized Hough transform.

17. The method of claim 15, further comprising:
calculating a weighted sum of respective filter activation scores associated with respective filter activations within a particular cluster of filter activations of the subset of clusters of filter activations to facilitate classification of the particular cluster of filter activations;
classifying whether respective clusters of filter activations of the subset of clusters of filter activations relate to the object of interest; and
identifying the cluster of filter activations as relating to the object of interest based at least in part on the classifying of the respective clusters of filter activations, wherein the cluster of filter activations is indicative of the location of the object of interest within the video frame.

18. The method of claim 17, further comprising:
training a classifier to differentiate between instances of accurate detection of a location of the object of interest in video frames, and instances of accurate detection of the object of interest not being located in video frames or false positive indications of location of the object of interest in video frames, based at least in part on a subset of training video frames; and identifying respective weights to be used to obtain respective weighted sums of the respective filter activation scores, based at least in part on the analysis results and the training of the classifier.

19. The method of claim 18, further comprising:

updating the training of the classifier based at least in part on a subset of video frames classified by the classifier.

20. A system, comprising:

means for identifying, using a trained linear filter model, whether a visual image potentially contains an object of interest based at least in part on Histogram of Gradient (HOG) features extracted from grid regions associated with the visual image;

means for clustering a subset of filter activations associated with the visual image to generate a cluster of filter activations that potentially identifies a location of the object of interest in the visual image, wherein the subset of filter activations is derived at least in part from the trained linear filter model; and means for classifying whether the cluster of filter activations is associated with the object of interest in the visual image, based at least in part on a Hough transform and a weighted sum of filter activation scores of the subset of filter activations within the cluster of filter activations.

* * * * *